May 14, 1935. W. J. COULTAS 2,001,183
RESILIENT WHEEL SUPPORT FOR HARVESTERS
Filed Aug. 29, 1932 2 Sheets-Sheet 1
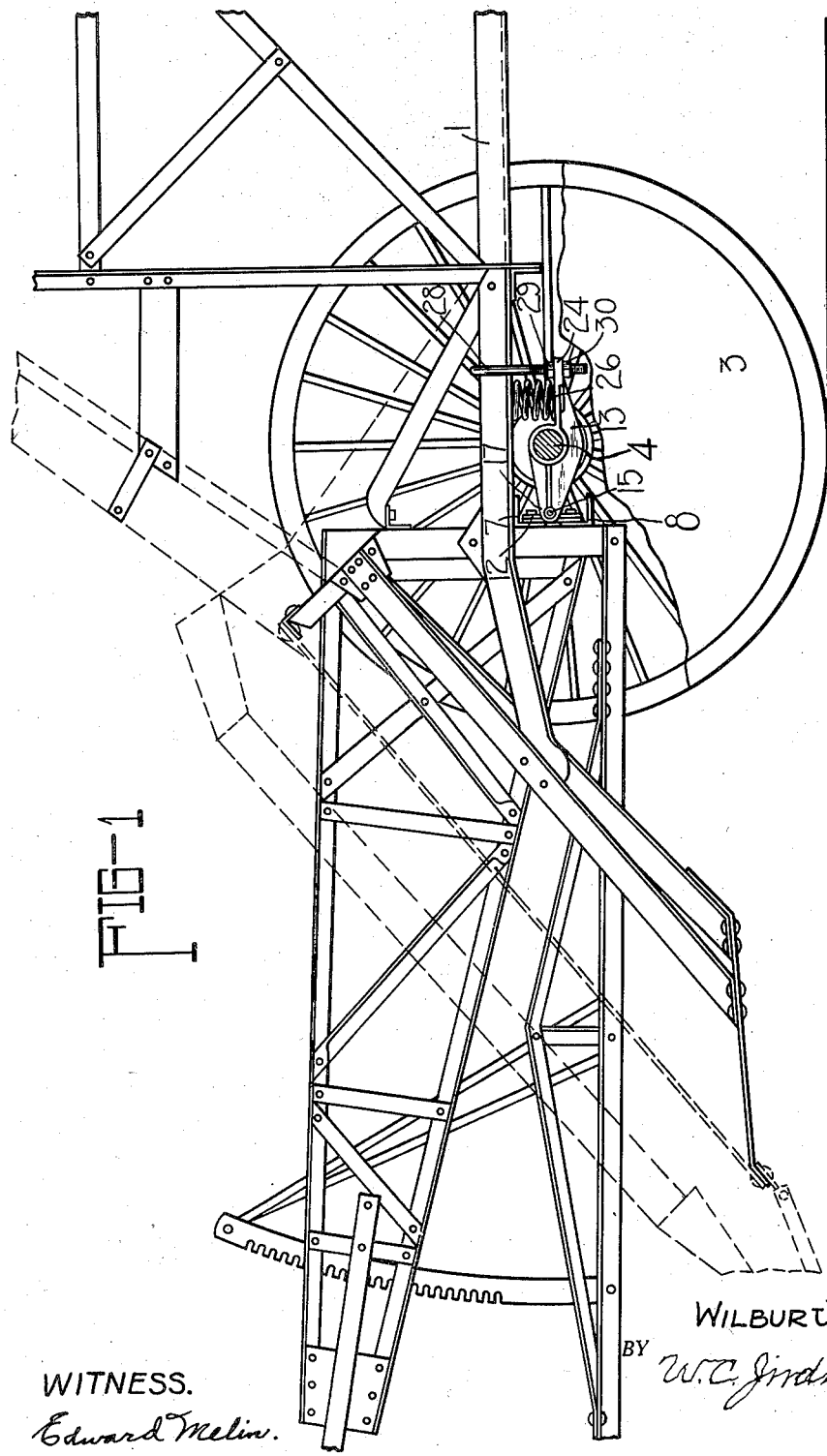
INVENTOR.
WILBUR J. COULTAS.
BY
ATTORNEY.
WITNESS.
Edward Melin.

May 14, 1935.  W. J. COULTAS  2,001,183
RESILIENT WHEEL SUPPORT FOR HARVESTERS
Filed Aug. 29, 1932  2 Sheets-Sheet 2
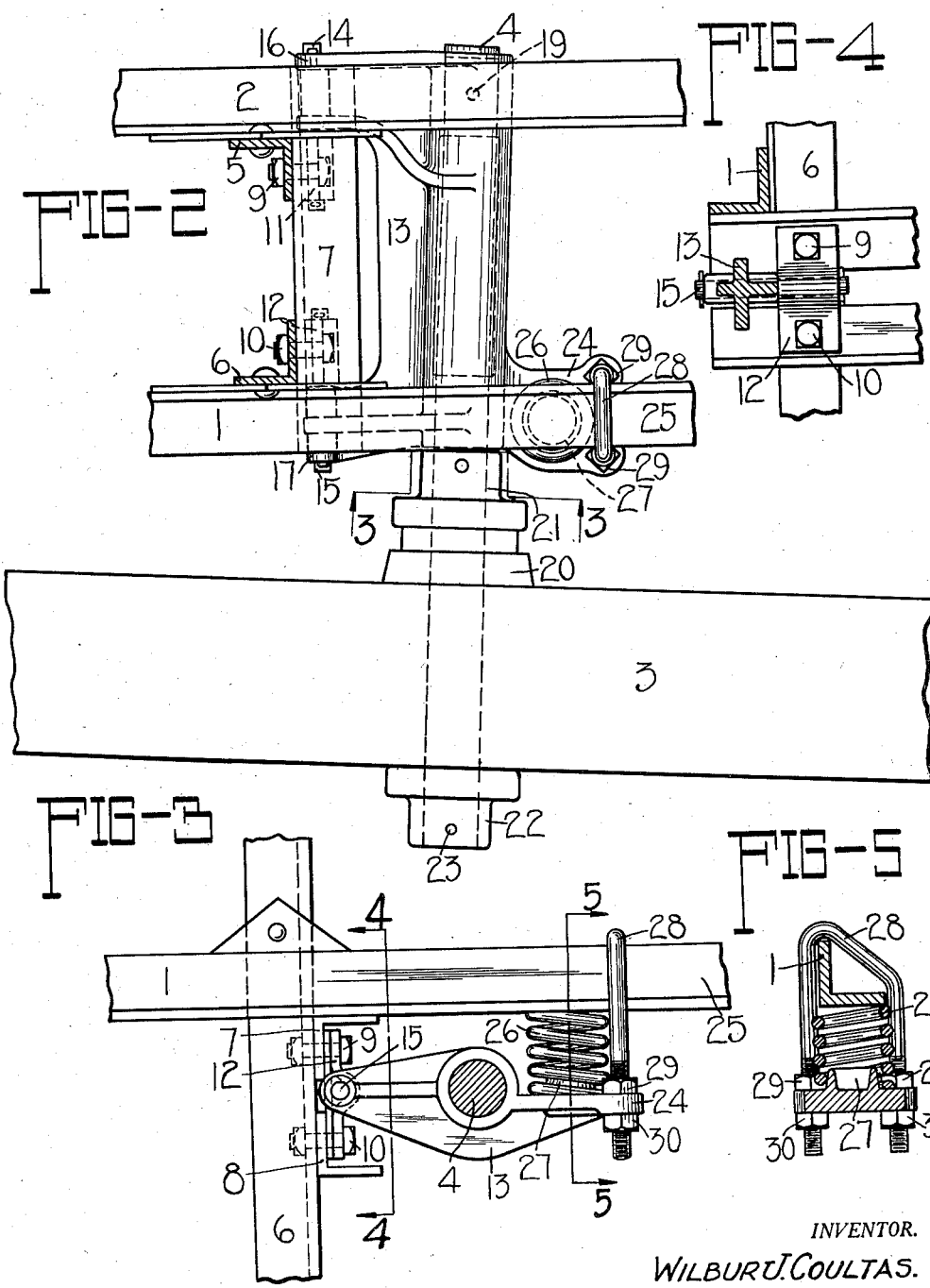
INVENTOR.
WILBUR J. COULTAS.
BY W.C. Jirdinston
ATTORNEY.
WITNESS.
Edward Melin.

Patented May 14, 1935

2,001,183

UNITED STATES PATENT OFFICE 2,001,183

RESILIENT WHEEL SUPPORT FOR HARVESTERS

Wilbur J. Coultas, Moline, Ill., assignor to Deere & Company, Moline, Ill., a corporation of Illinois Application August 29, 1932, Serial No. 630,832

3 Claims. (Cl. 280—124)

My invention relates to a device particularly applicable to the heavier type of harvesting machinery, including corn harvesters, for the purpose of absorbing the jolts received by such machines when operating over rough ground commonly present in the harvest. The object of my invention is to provide such a device having simplicity and economy in construction and operation and which can readily be assembled and mounted on the type of machines stated.

Referring to the drawings in which similar numerals indicate identical parts—

Figure 1 is a side elevation of as much of a corn harvester as deemed necessary to illustrate the application of my invention;

Figure 2 is an enlarged plan view of my device showing it as mounted on a corn harvester;

Figure 3 is a section on the line 3—3 of Figure 2;

Figure 4 is a detail section on the line 4—4 of Figure 3; and,

Figure 5 is a detail section on the line 5—5 of Figure 3.

The frame structure shown in Figure 1 includes fore and aft angle frame bars, only one of which is shown in Figure 1 and fragmentarily in Figures 2 and 3. These bars 1 and 2 form part of the base of the structure on which all other parts of the mechanism are supported. The near wheel 3 is partly shown in Figures 1 and 2 and the stub axle 4 on which it is journaled is in section. Vertical angle bars 5 and 6 are part of the rigid frame assembly of the machine and are secured to the bars 1 and 2 by rivets. Angle frame bars 7 and 8, one above the other, extend transversely of the bars 5 and 6 and are secured to the latter by bolts 9 and 10. Bearings 11 and 12 are mounted on the bars 7 and 8 and are secured thereto by the same bolts which fasten the transverse bars 7 and 8 to the vertical bars 5 and 6.

A casting 13 is rockably supported on spindles 14 and 15 in the bearings 11 and 12 and extends through lugs 16 and 17 forming a part of the casting 13. The stub axle 4 is secured in a transversely elongated sleeve part 18 of the casting 13, by a pin 19. Between the hub 20 of the wheel 3 and the casting 13 a collar 21 is mounted on the axle 4, and a similar collar 22 is mounted on the axle outside of the wheel 3 and held in place by a pin 23. Directly beneath the angle frame bar 1 there is an extension or lug 24 integral with the casting 13 and projecting rearwardly therefrom substantially diametrically opposite said pair of lugs, and between the extension 24 and the horizontal leg 25 of the bar 1 is located a coil spring 26 held in place by a circular stud 27 on the extension. An inverted U bolt 28 straddles the bar 1, its arms passing through openings in a pair of ears in the extension 24 and secured therein by nuts 29 above the extension 24 and nuts 30 below it, the U bolt operating to resist lateral strains on the casting 13 and consequent wear of the pivotal parts. It is also adjustable, by operation of the nuts 29 and 30, to compensate for wear of the spring 26.

As shown in the drawings, the machine is presumed to be on level ground with the parts of my invention in position in accordance therewith. Now it is evident that if the machine encounters a rough ground surface, usually present in a field where the machine is operated, jolts are absorbed by the spring 26, for with the downward movement of the machine the casting 13, pivotally attached to the vertical frame bars 5 and 6, is rocked on the axle 4, so that the part 24 of the casting is moved upwardly and compresses the spring 26 against the downward motion of the frame bar 1 which rests upon the spring 26, the jolt or shock of such a movement being compensated for by the expansive power of the spring. The bar 1 has a free vertical movement in the U bolt 28 when the spring 26 is compressed from jolting of the machine, and when the spring 26 expands to its normal position as shown in the drawings. The U bolt 28 is adjustable by operation of the nuts 29 and 30 to regulate the spring 26.

My device has proven very efficient in operation for the purpose stated and also adds to the comfort of the machine operator.

What I claim is:—

1. In a wheeled vehicle having a frame comprising a longitudinally extending member and a transversely extending member, the combination therewith of a casting comprising a transversely disposed elongated sleeve, a pair of lugs extending forwardly from opposite ends of said sleeve, means pivotally connecting the ends of said lugs to said transversely extending member whereby said casting may swing relative to said frame about a transverse horizontal axis, a wheel supported stub axle mounted in said sleeve, a lug extending rearwardly from one end of said sleeve and disposed beneath said longitudinally extending member, a coiled spring disposed between said lug and said longitudinally extending member, a pair of perforated transversely spaced ears on said rearwardly extending lug a U-bolt embracing said longitudinally extending member and having its ends projecting through the perforations in said ears, and means for adjustably securing the ends of said U-bolt to said ears.

2. The combination with a wheeled vehicle having a frame, of a casting comprising a transversely disposed elongated sleeve, a pair of lugs on the opposite ends of said sleeve, means pivotally connecting the ends of said lugs to said frame whereby said casting may swing relative to said frame about a transverse horizontal axis, a wheel supported stub axle mounted in said sleeve, a lug on said sleeve disposed substantially diametrically opposite said pair of lugs, said frame including a member disposed above said last named lug, a coil spring disposed between said frame member and said last named lug, a pair of perforated spaced ears on said last named lug, a U-bolt embracing said frame member, the ends of said U-bolt embracing said frame member, the ends of said U-bolt extending through the perforations in said ears, and means for adjustably securing the ends of said U-bolt to said ears.

3. The combination with a wheeled vehicle having a frame, of a casting comprising a transversely disposed elongated sleeve, means pivotally connecting said casting to said frame for vertical swinging movement about a transverse axis spaced longitudinally from said sleeve, a wheel supported axle mounted in said sleeve, a lug on said sleeve, said frame including a member disposed above said lug, a coil spring disposed between said frame member and said lug, a pair of perforated spaced ears on said lug, a U-bolt embracing said frame member, the ends of said U-bolt extending through the perforations in said ears, and means for adjustably securing the ends of said U-bolt to said ears.

WILBUR J. COULTAS.